(12) United States Patent
Giesen et al.

(10) Patent No.: US 11,226,404 B2
(45) Date of Patent: Jan. 18, 2022

(54) METHOD FOR OPERATING A LASER DISTANCE MEASUREMENT DEVICE

(71) Applicant: Robert Bosch GmbH, Stuttgart (DE)

(72) Inventors: Florian Giesen, Ostfildern (DE); Stefan Noe, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 95 days.

(21) Appl. No.: 16/122,119

(22) Filed: Sep. 5, 2018

(65) Prior Publication Data

US 2019/0072656 A1  Mar. 7, 2019

(30) Foreign Application Priority Data

Sep. 7, 2017  (DE) .................. 10 2017 215 783.6

(51) Int. Cl.
| | | |
|---|---|---|
| *G01S 7/497* | (2006.01) | |
| *G01S 17/89* | (2020.01) | |
| *G01S 17/08* | (2006.01) | |
| *G01S 7/51* | (2006.01) | |
| *G06F 3/041* | (2006.01) | |
| *G01S 17/86* | (2020.01) | |

(52) U.S. Cl.
CPC .............. *G01S 7/4972* (2013.01); *G01S 7/51* (2013.01); *G01S 17/08* (2013.01); *G01S 17/86* (2020.01)

(58) Field of Classification Search
CPC ........ G01S 7/4972; G01S 7/51; G01S 17/023; G01S 17/89; G01S 17/08; G06F 3/0418; G01J 5/025; G01J 5/0265; G01J 5/0295; G01J 5/0859; G01J 5/089; G01J 5/0896; H04N 5/2254; H04N 5/2258; H04N 5/23212; H04N 5/23293; H04N 5/33; H04N 5/332
See application file for complete search history.

(56) References Cited

U.S. PATENT DOCUMENTS

| | | | | |
|---|---|---|---|---|
| 7,538,326 | B2 * | 5/2009 | Johnson .................. | G01C 3/08 250/370.08 |
| 8,531,562 | B2 * | 9/2013 | Schmidt .............. | H04N 5/2254 348/262 |
| 8,908,157 | B2 * | 12/2014 | Eisele ..................... | G01C 3/08 356/5.01 |

(Continued)

FOREIGN PATENT DOCUMENTS

| | | |
|---|---|---|
| DE | 100 55 510 A1 | 5/2002 |
| DE | 10 2012 214 880 A1 | 6/2013 |
| EP | 2 669 707 A1 | 12/2013 |

*Primary Examiner* — Sang H Nguyen
(74) *Attorney, Agent, or Firm* — Maginot, Moore & Beck LLP

(57) ABSTRACT

A method for operating a hand-held laser distance measurement device for contactless distance measurement in a calibration mode is based on a method in which a laser distance measurement unit of the laser distance measurement device is used to emit laser radiation to a target point, a camera of the laser distance measurement device is used to acquire at least one image of at least one target environment of the target point, and a screen of the laser distance measurement device is used to output a display of the image overlaid with a marker of the target point. A parallax error in the display of the image overlaid with the marker of the target point is corrected.

10 Claims, 4 Drawing Sheets

(56) References Cited

U.S. PATENT DOCUMENTS

| | | | | |
|---|---|---|---|---|
| 2012/0262696 A1* | 10/2012 | Eisele | .................... | G01C 3/08 |
| | | | | 356/4.01 |
| 2014/0071433 A1* | 3/2014 | Eisele | .................. | G01S 7/4816 |
| | | | | 356/5.01 |
| 2014/0176725 A1* | 6/2014 | Stuart | .................... | G01J 5/025 |
| | | | | 348/164 |
| 2015/0304636 A1* | 10/2015 | Rhead | .................... | H04N 5/33 |
| | | | | 348/46 |
| 2017/0138728 A1* | 5/2017 | Lancaster | ................ | B25G 1/00 |

* cited by examiner (a)

(b)

METHOD FOR OPERATING A LASER DISTANCE MEASUREMENT DEVICE

This application claims priority under 35 U.S.C. § 119 to patent application no. DE 10 2017 215 783.6, filed on Sep. 7, 2017 in Germany, the disclosure of which is incorporated herein by reference in its entirety.

The disclosure relates to a method for operating a laser distance measurement device, in particular a hand-held laser distance measurement device.

BACKGROUND

Methods for operating laser distance measurement devices have already been proposed, for example in DE 10 2012 214 880 A1 or in EP 2669707 A1.

SUMMARY

The proposed method for operating a laser distance measurement device, in particular a hand-held laser distance measurement device, for contactless distance measurement in a calibration mode, is based on a method in which a laser distance measurement unit of the laser distance measurement device is used to emit laser radiation to a target point, a camera of the laser distance measurement device is used to acquire at least one image of at least one target environment of the target point, and in which a screen of the laser distance measurement device is used to output a display of the image overlaid with a marker of the target point. The method makes it possible, in the calibration mode according to the disclosure, to correct a parallax error in the display of the image overlaid with the marker of the target point.

The laser distance measurement device, in particular its functional components the laser distance measurement unit and the computing unit, is intended to emit temporally modulated laser radiation in the form of a laser beam in the direction of a target object whose distance from the measurement device is intended to be determined. The point at which the emitted laser beam meets the target point is called 'target point' hereinafter. The direction in three-dimensional space in which the laser beam is emitted onto the target object is referred to as distance measurement direction hereinafter. With respect to the laser distance measurement device, the distance measurement direction is defined by construction, in particular by the arrangement of the laser distance measurement unit, in particular of a transmission apparatus of the laser distance measurement unit, in a housing of the laser distance measurement device. The terms 'laser radiation' and 'laser beam' are used synonymously in the following text. The concepts of laser distance measurement are familiar to those skilled in the art.

'Provided' or 'intended' in the following text should be specifically understood to mean 'programmed', 'configured', 'designed' and/or 'equipped'. An object being 'provided' with a particular function should be understood in particular to mean that the object performs and/or executes this particular function in at least one application state and/or operating state, or is configured to perform the function. Laser radiation that is reflected or scattered, that is to say radiated back, by the desired target object is at least partly detected by the laser distance measurement device, in particular by a reception apparatus of the laser distance measurement unit, and used to determine the distance to be measured in the distance measurement direction. The reception apparatus is in this case designed to detect reflected laser radiation. In particular, the reception apparatus has a two-dimensional detection surface having a multiplicity of pixels, wherein each pixel is intended to produce a detection signal depending on an incident light intensity of reflected laser radiation and output it for further processing, in particular to the computing unit or to a control device of the laser distance measurement device. 'Pixels' are understood to mean laser radiation-sensitive elements such as photodiodes, for example PIN diodes or avalanche photodiodes (APD) or the like. In one embodiment of the laser distance measurement device, the detection surface is formed by a two-dimensional arrangement ('array') of a multiplicity of single-photon avalanche diodes (SPADs). By way of example, the detection surface may consist of 32×32 SPADs arranged in a matrix.

The laser distance measurement device is used for the contactless measurement of a distance to the target point. From a phase comparison, performed by way of the computing unit or by way of the reception apparatus, between the emitted laser radiation and the laser radiation reflected off the surface of the target object, it is possible to determine a light propagation time and to establish the sought distance between the laser distance measurement device and the target object, in particular between the laser distance measurement device and the target point in the corresponding distance measurement direction, using the speed of light. As an alternative, the light propagation time may also be determined by establishing the time of flight, as is known to those skilled in the art. The distance that is determined, that is to say the distance measurement value, may then subsequently be processed further by way of an evaluation or control device of the laser distance measurement device and/or be output, using an output device such as a screen, to a user of the laser distance measurement device.

In one embodiment, the laser distance measurement device is embodied as a hand-held measurement device that is able to be guided just using the hands, preferably using one hand, without the additional help of a transport and/or holding device. To this end, the overall weight of the laser distance measurement device is in particular less than 500 g, preferably less than 300 g, particularly preferably less than 200 g. In one embodiment of the laser distance measurement device, all of the components of the measurement device are accommodated in a housing substantially enclosing the components. In particular, the length of the longest side of this housing is less than 30 cm, preferably less than 20 cm, particularly preferably less than 15 cm.

According to the disclosure, the laser distance measurement device has a camera for acquiring at least one image of a target environment of a respectively aimed-at target point. In one embodiment, the camera may be embodied as a CCD chip or another image acquisition means, in particular one that is sensitive in the visual spectrum. In one embodiment of the camera, said camera is configured as a fixed-focus camera, that is to say the camera optics have an invariable focus. As an alternative, the camera may be embodied as an automatically focusing camera. In one embodiment, the camera has a fixed magnification or zoom level. As an alternative, the camera may also have a zoom functionality. An image at least of the target environment of the target point is able to be captured by way of the camera. The target environment around the corresponding target point is in this case in particular defined by that spatial or acquisition angle at which light is gathered by way of the optics of the camera and converted into an image. In one embodiment, the image of the target environment of a target point may be changed, in particular shrunk or magnified, using beam-forming and/ or beam-deflecting optical elements, in particular for example using lenses, diffractive elements, mirrors or the like. As an alternative or in addition thereto, the image of the target environment of a target point may also be changed with the aid of software, in particular magnified or shrunk. It is pointed out at this juncture that part of the image captured of the target environment of a target point also again itself constitutes an image of the target environment of the target point. In the context of this document, each partial section of an image of the target environment of a target point therefore itself also counts as an image of the target environment of the target point.

The laser distance measurement device has a screen, an image acquired using the camera or a partial area of an image being able to be displayed by way of the screen. In this case, during operation of the laser distance measurement device, at least one marker is able to be displayed overlaid on or inserted onto the image, which marker identifies or marks the target point at which the laser beam meets the target object in the output image, in particular the output partial region of the image.

The laser distance measurement device furthermore has a computing unit. The computing unit in particular has components that comprise at least a processor, a memory and an operating program with evaluation and calculation routines. In particular, the electronic components of the computing unit may be arranged on a board or printed circuit board. In one embodiment, the computing unit is configured integrally with a control device of the laser distance measurement device. In one embodiment, the computing unit is configured in the form of a microcontroller. The computing unit is intended and set up to calculate a distance from a distance measurement by way of the laser distance measurement unit (consisting of a transmission apparatus and a reception apparatus). Furthermore, the computing unit is also intended and set up to perform the method according to the disclosure. In particular, the computing unit is intended to produce a display in which an image, acquired using the camera, of the target environment of the target point is marked with a marker of the target point. In this case, the marker is to be understood as a marker that is inserted into the image or inserted onto the image and that clearly marks and therefore highlights the target point in the image, in particular the position of the target point in the image. In particular, the marker may for example be embodied as a crosshair, a square, a circle or the like. Furthermore, the computing unit is intended to output the dataset produced by overlaying the image with the marker on a screen of the laser distance measurement device, using which a corresponding display, again in the form of an image, is output to an operator of the laser distance measurement device. According to the disclosure, the computing unit is intended and set up to correct a parallax error in the dataset, that is to say in the display of the image overlaid with the marker of the target point, in the calibration mode.

The method according to the disclosure for operating the laser distance measurement device is used for example in a scenario in which a user of the laser distance measurement device wishes to perform a measurement of a distance to an object at a large distance, the target object. It may be the case here, in particular in a bright outdoor area, that the target point is not discernible to the eye on account of the great distance. The laser distance measurement device according to the disclosure therefore displays, on its screen, the target point overlaid on and in the image acquired using the camera of the target environment of the target point. In this way, the operator of the laser distance measurement device is able to find the position of the target point, that is to say the direction in which the distance is established by way of laser distance measurement, in spite of the great distance. If the operator wishes for example to establish a distance to a wooden post, then he is able to view an image of the wooden post—or, depending on the distance and zoom level of the camera optics, a section thereof—on the screen. In this case, the target point—typically a red point produced by red laser radiation—is likewise acquired by the camera and output on the screen. Furthermore, the position of the target point is inserted into the image as a marker, in particular as a crosshair. Should the operator then no longer be able to discern the target point with the naked eye—either directly on the target object or on the display, output using the screen, of the image—he is then able to point the laser distance measurement device, in particular the emitted laser beam, at the wooden post using the output image overlaid with the marker of the target point. The laser distance measurement device therefore has a virtual optical targeting apparatus for improving the visibility of the target point in the display, output on the screen, of the image captured using the camera. The targeting apparatus allows certain handling of the laser distance measurement device with regard to erroneous measurements caused by erroneous aiming at a target object.

On account of the spaced-apart arrangement of the transmission device, in particular a laser diode, and the camera in the housing of the laser distance measurement device, a parallax error is caused. The 'parallax error' is in this case the angle produced between the optical axis of the transmission apparatus and the optical axis of the camera, both axes being directed from different starting points—that is to say the laser diode and the camera (spaced apart by the 'base distance')—onto the same point—the target point. The parallax error is typically calibrated during manufacturing of the laser distance measurement device, that is to say the field of view of the camera is matched to the alignment of the laser distance measurement unit (in particular of the transmission unit) in a calibration process. Consequently, the laser distance measurement device outputs, on the screen, a display of the image overlaid with the marker of the target point, in which display the target point and the marker coincide. In particular, this calibration process is performed for a target point at a relatively great distance, since a deviation of the marker of the target point from the target point actually discernible in the image is negligible at relatively short distances—here, the operator is able to orient himself directly towards the projected target point and does not need to refer to the screen of the laser distance measurement device.

On account of unavoidable tolerances in the relative alignment of the camera and the laser distance measurement unit (in particular the transmission unit) with respect to one another, and on account of changes for example caused by aging, mechanical effects such as impacts, by changes in temperature or the like, the camera and the laser distance measurement unit (in particular the transmission unit) may become decalibrated with respect to one another. This decalibration is manifested in a shifting of the marker of the target point in an output display of the image overlaid with the marker of the target point. Consequently, such disadvantageous effects are manifested in an exacerbation of the construction-defined parallax error, that is to say in an increasing lateral offset of the relative position of the image output using the screen and the output marker, overlaid on the image, of the target point with respect to one another. According to the disclosure, the parallax error in the display of the image overlaid with the marker of the target point may be corrected in a calibration mode of the laser distance measurement device. 'Calibration mode' is understood to mean in particular an operating state of the laser distance measurement device in which a particular functionality is available. In particular, the computing unit of the laser distance measurement device has an operating state in which the method according to the disclosure is performed. The calibration mode may in particular be implemented in the form of a function of the laser distance measurement device that is executed by the computing unit. In one embodiment, in this case the calibration mode is initiated by an operator input by an operator of the laser distance measurement device. In this way, recalibration of the laser distance measurement device, that is to say of the parallax error in the display of the image overlaid with the marker of the target point, is possible at any time and in particular when required. 'Correct parallax errors' is understood in particular to mean that said lateral offset of the relative position of the image output using the screen and of the output marker, overlaid on the image, of the target point is adjusted, in particular corrected or removed. In one embodiment of the method, the parallax error in the display of the image overlaid with the marker of the target point is corrected by adjusting the relative position of the output image and of the marker with respect to one another.

In one embodiment of the method according to the disclosure, the relative position of the image and of the marker with respect to one another is corrected by an operator input, in particular a manual one. By way of example, the relative position of the image and of the marker with respect to one another may be shifted using operator elements, in particular using a keyboard or cursor keys. As an alternative or in addition, the relative position of the image and of the marker with respect to one another may be shifted using a touch-sensitive screen. Again as an alternative or in addition, the relative position of the image and of the marker with respect to one another may be shifted using an item of software executed on an external data processing device. A 'data processing device' is understood to mean for example a smartphone or a computer or the like, which communicates with the laser distance measurement device using a data communication interface. The data communication interface may in this case for example be configured as a WLAN and/or Bluetooth interface.

In one embodiment of the method according to the disclosure, the relative position of the image and of the marker with respect to one another is corrected by shifting the marker in the display of the image overlaid with the marker of the target point. In other words, the position of the marker relative to the display, output on the screen, of the image is adjusted and shifted. This implementation is made available to an operator of the laser distance measurement device for example in that the marker of the target point is able to be shifted to any desired side of the screen by an input, for example by way of a touch-sensitive screen (the marker does not stay in the center of the screen). As an alternative thereto, it may also be provided that the relative position of the image and of the marker with respect to one another is corrected by shifting the image in the display of the image overlaid with the marker of the target point. In this way, the position of the output image relative to the marker is shifted. In particular, an image portion may also be changed and/or shifted. This implementation is made available to an operator of the laser distance measurement device for example in that the target point is always located in the middle of the display output on the screen—in one embodiment additionally marked with a marker (the marker remains unchanged in the center of the screen, the image (portion) is shifted). Furthermore, in one embodiment, it may be provided to deactivate the insertion of the marker, that is to say the overlaid display of the image and the marker, for distances less than a predefined threshold value (for example for distances of less than 15 meters).

In one embodiment of the method, the relative position of the image and of the marker with respect to one another is corrected automatically, in particular using the computing unit. In particular, the relative position of the image and of the marker with respect to one another is corrected automatically by detecting the target point in the image and determining its position, for example in pixel coordinates, the relative position of the image and of the marker with respect to one another being corrected such that the marker comes to lie on the determined position of the target point. In one exemplary embodiment, the automatic correction may be implemented using two images, one of the two images being acquired when the laser distance measurement unit is turned off, that is to say without a laser beam being emitted, and the second of the two images being acquired when the laser distance measurement unit is turned on, that is to say with a laser beam being emitted. Subtracting the two images from one another then allows particularly simple detection of the target point in the image by determining its position, for example in pixel coordinates, by taking a threshold value into consideration. The pixel coordinates make it possible to establish the lateral offset that has to be applied to correct the parallax error in terms of the relative position of the image and of the marker with respect to one another. Consequently, the relative position of the output image and of the marker with respect to one another is able to be corrected in the context of the image-processing algorithm performed by the computing unit. In one embodiment, the display of the image overlaid with the marker is output in real time, in particular synchronously with a movement of the laser distance measurement device. In this way, during the movement of the laser distance measurement device by the user, a current image of the target environment, aimed at the given time, of the currently desired target point is always output. At the same time as the updated outputting of the image, the marker of the target point in the display is updated automatically and therefore displayed in corrected form. 'In real time' and 'synchronously with a movement of the laser distance measurement device' should in particular be understood to mean, in this connection, that the processing speed of the computing unit is so high that repositioning of the laser distance measurement device in space by the user results immediately in a change of the displayed image, in particular overlaid with the marker. In this way, the user of the laser distance measurement device may immediately, that is to say 'synchronously', associate a movement in space executed using the laser distance measurement device with a change in the output image including the marker. Through a high processing rate, the user of the laser distance measurement device may get the impression that image data for a target area aimed at using the laser distance measurement device, in particular a target environment of a target point, is evaluated immediately and that the marker is immediately displayed correctly. Outputting of the display of the image overlaid with the marker in 'real time' should then be assumed if the processing time within the device until output is complete is in particular less than 0.5 seconds, preferably less than 0.1 seconds, particularly preferably less than 0.05 seconds. As a result, the user of the laser distance measurement device is able to discern the target point at which the laser distance measurement device is pointed particularly quickly, without a delay and therefore with certainty. Advantageously, it is therefore possible to provide a particularly efficient laser distance measurement device with intuitive operation and high operator comfort. In particular, an automatic correction makes it possible, for any desired distance between the laser distance measurement device and the target object with respect to one another, for the position of the marker of the target point with respect to the image (that is to say in the overlaid display, output on the screen, of the image) to correspond to the actual position, discernible in the image (with appropriate lighting conditions), of the depicted target point.

On the basis of the method according to the disclosure, the user is able to operate the laser distance measurement device in a particularly intuitive and therefore simple manner. Erroneous operation of the laser distance measurement device, in particular an incorrectly performed alignment of the laser distance measurement device, is able to be avoided.

Furthermore, a laser distance measurement device according to the disclosure, in particular a hand-held laser distance measurement device, for performing the method according to the disclosure is proposed. The laser distance measurement device has, as described, at least one laser distance measurement unit for the contactless determination of a distance to a target point by emitting a laser beam, a camera for acquiring at least one image of at least one target environment of the target point, a screen for outputting a display of the image overlaid with a marker of the target point, and a computing unit for performing the method according to the disclosure.

BRIEF DESCRIPTION OF THE DRAWINGS

The disclosure is explained in more detail in the following description with reference to exemplary embodiments illustrated in the drawings. The drawings, the description and the claims contain numerous features in combination. A person skilled in the art will expediently also consider the features individually and combine them to form feasible further combinations. Identical reference signs in the figures refer to identical elements.

In the figures.

DETAILED DESCRIPTION

Figure 1:
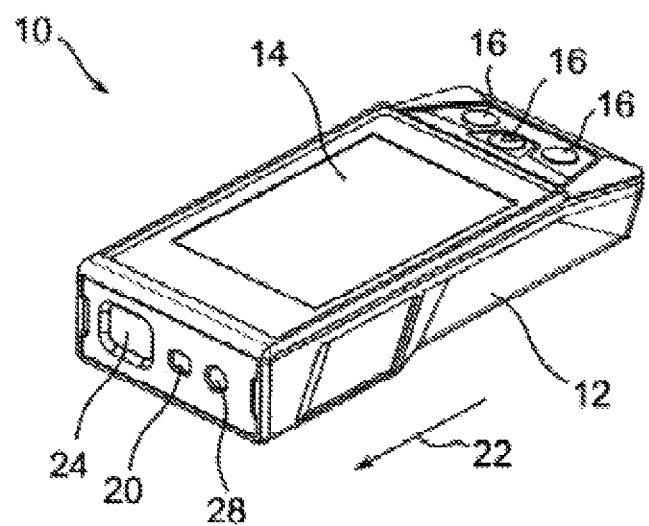
FIG. 1 shows a perspective view of one refinement of the laser distance measurement device according to the disclosure.

FIG. 1 shows a perspective illustration of one exemplary embodiment of a hand-held laser distance measurement device 10, which has a housing 12, a touch-sensitive screen 14 and activation elements 16 for turning on and turning off the laser distance measurement device 10 and for starting or configuring a measurement process. The activation elements 16 furthermore perform the function of cursor keys. To measure the distance of the laser distance measurement device 10 to a target object 18 (cf. FIG. 2), during operation of the laser distance measurement device 10, parallel laser radiation (not illustrated in more detail here) is transmitted in the direction of the target object 18 via transmission optics 20 consisting for example of a lens system, not illustrated in more detail. The direction in which the laser distance measurement device 10 emits laser radiation is called distance measurement direction 22 hereinafter. The transmission optics 20 and a laser diode (not illustrated in more detail here) form part of the transmission apparatus of the laser distance measurement device 10. The laser radiation (not illustrated in more detail here) reflected off a surface of the target object 18 is routed via reception optics 24 (here in the form of a lens) onto a two-dimensional detection surface (not illustrated in more detail here) and is detected there. The two-dimensional detection surface is formed for example as a two-dimensional arrangement ('array') of 17×17 single-photon avalanche diodes (SPADs) arranged in a matrix, each SPAD being intended to produce a detection signal depending on an incident light intensity of reflected laser radiation and to output it for further processing, in particular to a computing unit, not illustrated in more detail, or to a control device, not illustrated in more detail, of the laser distance measurement device 10. The reception optics 24 and the detection surface form part of a reception apparatus. The transmission apparatus and the reception apparatus together form the laser distance measurement unit of the laser distance measurement device 10. From a phase comparison performed between the emitted laser radiation and the laser radiation reflected off the surface of the target object 18, a light propagation time is able to be determined and the sought distance between the laser distance measurement device 10 and the target object 18 in the distance measurement direction 22 is able to be established using the speed of light. The laser radiation is embodied as red laser light in this exemplary embodiment. The emitted laser radiation produces a projected laser point, what is called the target point 26, on the target object 18.

The laser distance measurement device 10 furthermore has a camera 28 that is intended to capture at least one image 30 of a target environment 32 (cf. FIGS. 2 and 3) of the target point 26. In this case, the camera 28 is accommodated in the laser distance measurement device 10, in particular accommodated in the housing 12 of the laser distance measurement device 10, such that it is aligned in the distance measurement direction 22. The camera 28 is thus accommodated in a fixed position in the housing 12 with respect to the housing 12. The camera is embodied as a CCD chip and constitutes a fixed-focus camera.

The laser distance measurement device 10, for its power supply, has a power supply device, not illustrated in more detail, in particular a battery or a rechargeable battery, preferably a lithium ion rechargeable battery.

Furthermore, the laser distance measurement device 10 has components that are not illustrated in more detail in the figures. These comprise at least one computing unit. The computing unit in particular has components that comprise at least a processor, a memory and an operating program with evaluation and calculation routines. The computing unit is intended to calculate a distance from a distance measurement and to produce a display 34,34a,34b in which an image 30, acquired using the camera 28, of the target environment 32 of the target point 26 is marked overlaid with a marker 36,36a,36b of the target point 26 (cf FIGS. 2 and 3), here a crosshair. The marker 36,36a,36b is inserted into the image 30 and marks the target point 26 in the image 30. Furthermore, the computing unit is intended to output the dataset (that is to say the display 34,34a,34b) produced by overlaying the image 30 with the marker 36,36a,36b on the screen 14 of the laser distance measurement device 10 (cf. FIGS. 2 and 3). By way of the screen 14, the corresponding display 34,34a,34b is again output in the form of an image to an operator of the laser distance measurement device 10. The computing unit is configured to activate a calibration mode following an operator input by an operator of the laser distance measurement device 10. The calibration mode is implemented as a function of the laser distance measurement device 10 in the software of the computing unit and is executed after activation of the computing unit. In the calibration mode according to the disclosure, it is possible to recalibrate the laser distance measurement device 10 with regard to a parallax error, a lateral offset of the relative position of the image 30 output using the screen 14 and of the output marker 36,36a,36b, overlaid on the image 30, of the target point 26 (what is called the parallax error) being adjusted, in particular corrected or removed. The computing unit has all of the values and instructions needed to perform the method according to the disclosure.

Figure 2:
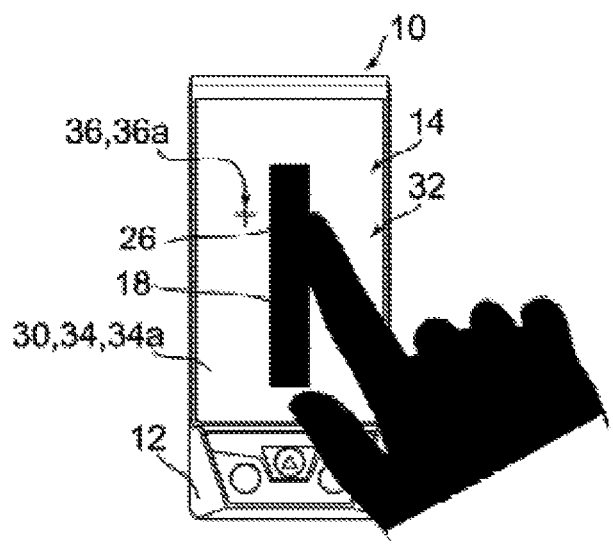
FIG. 2 shows a view of one embodiment of a laser distance measurement device with a display, output on the screen, of an image of the target environment of the target point overlaid with a marker of the target point before method is performed (a) and after the method is performed (b)
Figure 2:
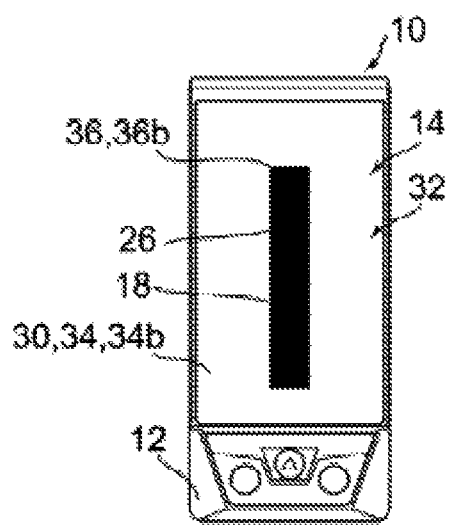
Figure 3:
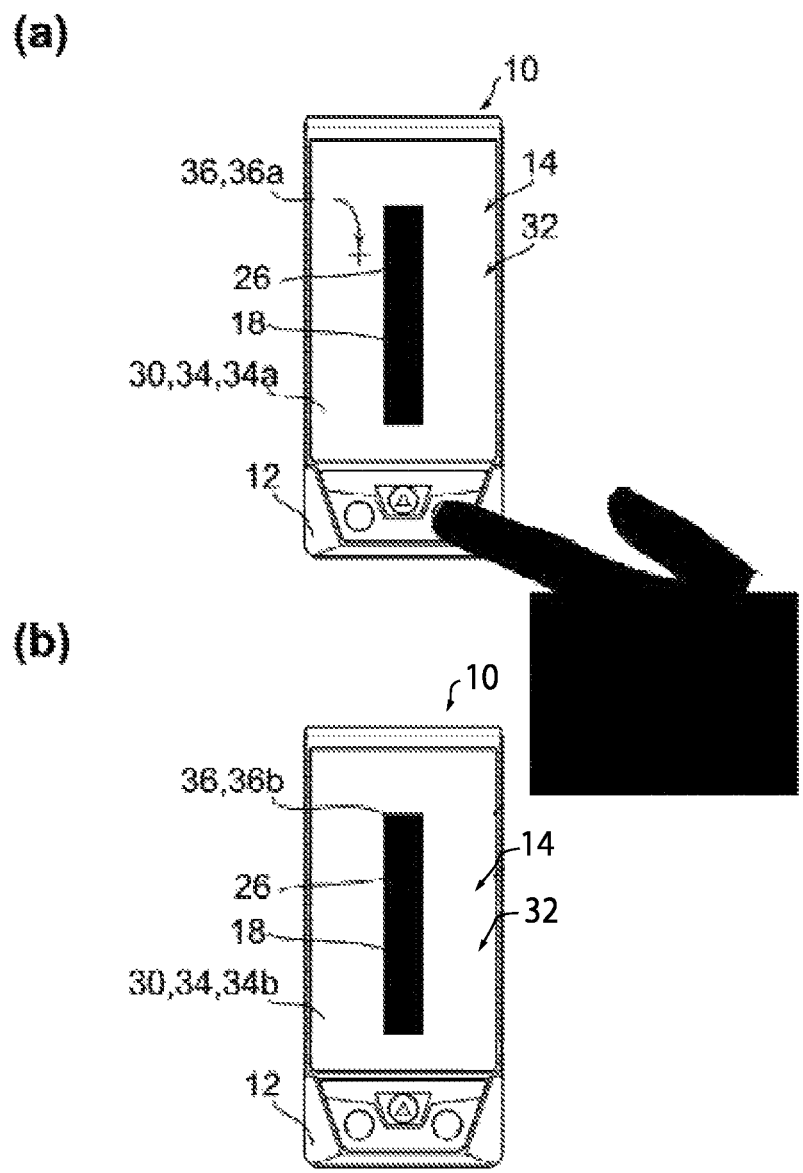
FIG. 3 shows a view of an alternative embodiment of a laser distance measurement device with a display, output on the screen, of an image of the target environment of the target point overlaid with a marker of the target point before method is performed (a) and after the method is performed (b)

FIGS. 2 and 3 each illustrate schematic views of a laser distance measurement device 10, a display 34,34a,34b of the image 30 overlaid with a marker 36,36a,36b of the target point 26 being output in each view. FIGS. 2a and 3a in this case show displays 34,34a such as are output before the method according to the disclosure is performed, while FIGS. 2b and 3b show displays 34,34b such as are output after the method according to the disclosure is performed, that is to say after correction of the parallax error. FIGS. 2 and 3 are in this case based on the following scenario: the laser diode of the laser distance measurement device 10 emits laser radiation in the distance measurement direction 22. The laser radiation is reflected or scattered by the target object 18 and returns to the laser distance measurement device 10 as reflected laser radiation. The camera 28 captures an image 30 of a target environment 32 of the target point 26 (cf. FIGS. 2a, 2b, 3a, 3b).

On account of external influences, in particular mechanical effects, changes in temperature, or else aging of the laser distance measurement device 10, the camera 28 and the laser distance measurement unit (in particular the transmission unit) may become decalibrated with respect to one another. This decalibration is manifested in the shifting of the (uncorrected) marker 36,36a of the target point 26 in the output display 34,34a of the image 30 overlaid with the marker 36,36a of the target point 26 (cf. FIGS. 2a and 3a). This parallax error has the effect that the position of the marker 36,36a of the target point 26 with respect to the image 30 (that is to say in the overlaid display 34,34a output on the screen 14) no longer corresponds to the actual position of the depicted target point 26 discernible in the image 30 (in appropriate lighting conditions), cf in particular FIG. 2a and FIG. 3a (parallax error).

Through an input by way of the operator elements 16, an operator of the laser distance measurement device 10 is now able to initiate the calibration mode and then correct the parallax error by adjusting the relative position of the image 30 and of the (uncorrected) marker 36,36a with respect to one another. As indicated in FIG. 2a, in this case the relative position of the image 30 and of the marker 36,36a with respect to one another may be corrected by an operator input, in particular a manual one, using the touch-sensitive screen 14. This is indicated in FIG. 2a by a finger that taps the position of the target point 26 in the display 34,34a. The computing unit obtains the pixel coordinates of the point of contact with respect to the display 34,34a, in particular with respect to the output image 30, and then uses these pixel coordinates as new pixel coordinates of the corrected marker 36,36b in a further output of a display 34,34b of the image 30 overlaid with the marker 34,34b of the target point 26, cf FIG. 2b. As an alternative or in addition, as indicated in FIG. 3a, the relative position of the image 30 and of the marker 36,36a with respect to one another may also be corrected by an operator input, in particular a manual one, using the operator elements 16. This is indicated in FIG. 3a by a finger that presses one of the operator elements 16 in order to shift the position of the (uncorrected) marker 36,36a in the display 34,34a to the right to the target point 26 discernible in the display 34,34a. The computing unit shifts the position of the marker 36,36a, stores the new pixel coordinates with respect to the display 34,34a, in particular with respect to the output image 30, and then uses these pixel coordinates as new pixel coordinates of the corrected marker 36,36b in a further output of a display 34,34b of the image 30 overlaid with the marker 34,34b of the target point 26, cf. FIG. 3b.

Figure 4:
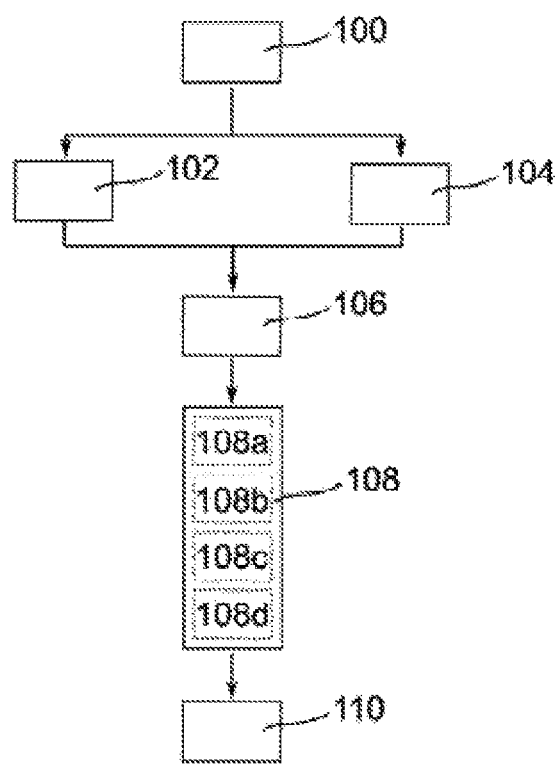
FIG. 4 shows a schematic illustration of the method according to the disclosure in a method diagram.

FIG. 4 illustrates one embodiment of the method according to the disclosure with reference to a method diagram. In method step 100, the calibration mode according to the disclosure is initiated by an operator input, whereupon laser radiation is emitted to a target point 26 by way of the laser distance measurement unit, in particular by way of the transmission apparatus, in method step 102. At substantially the same time, in method step 104, the camera 28 is used to acquire at least one image 30 of the target environment 32 of the target point 26 while the laser radiation is being emitted. In method step 106, a display 34,34a of the image 30 overlaid with a marker 36,36a of the target point 26 is output on the screen 14 of the laser distance measurement device 10. In this case, an image 30 may be acquired and the display 34,34a may be output either repeatedly (in a kind of 'live mode') or else just once.

Subsequently, in method step 108, a parallax error in the display 34,34a of the image 30 overlaid with the marker 36,36a of the target point 26 is corrected by adjusting the relative position of the image 30 and of the (uncorrected) marker 36,36a with respect to one another. The correction, that is to say the shift of the relative position of the image 30 and of the marker 36,36a with respect to one another, may in this case be performed by an operator input, in particular a manual one, in particular be effected using the touch-sensitive screen 14 (cf FIG. 2; method step 108a), using operator elements 16 (cf FIG. 3; method step 108b) and/or using an item of software executed on an external data processing device (not illustrated in more detail here; method step 108c).

As an alternative or in addition, the relative position of the image 30 and of the marker 36,36a with respect to one another may also be corrected automatically by detecting the target point 26 in the image 30 and determining its position, the relative position of the image 30 and of the marker 36,36 with respect to one another being corrected such that the corrected marker 36,36b lies on the determined position of the target point 26 (method step 108d).

In method step 110, the determined values, in particular the corrected pixel coordinates of the marker 36,36b, are stored by the computing unit.

What is claimed is:

1. A method for operating a hand-held laser distance measurement device for contactless distance measurement in a calibration mode, comprising:
   emitting laser radiation to a target point with a laser distance measurement unit of the laser distance measurement device;
   acquiring at least one image of at least one target environment of the target point with a camera of the laser distance measurement device, the at least one image being a visible light image;
   outputting a display of the at least one image overlaid with a marker of the target point using a screen of the laser distance measurement device; and
   correcting a parallax error in the display of the at least one image overlaid with the marker of the target point.

2. The method according to claim 1, further comprising:
   correcting the parallax error by adjusting a relative position of the at least one image and of the marker with respect to one another.

3. The method according to claim 2, wherein the relative position of the at least one image and of the marker with respect to one another is corrected by an operator input.

4. The method according to claim 2, further comprising:
   shifting the relative position of the at least one image and of the marker with respect to one another using operator elements.

5. The method according to claim 2, further comprising:
   shifting the relative position of the at least one image and of the marker with respect to one another using a touch-sensitive screen.

6. The method according to claim 2, further comprising:
   shifting the relative position of the at least one image and of the marker with respect to one another using an item of software executed on an external data processing device.

7. The method according to claim 2, further comprising:
   correcting automatically the relative position of the at least one image and of the marker with respect to one another.

8. The method according to claim 7, wherein:
   the relative position of the at least one image and of the marker with respect to one another is corrected automatically by detecting the target point in the at least one image and determining a position of the target point, and
   the relative position of the at least one image and of the marker with respect to one another is corrected such that the marker lies on the determined position of the target point.

9. The method according to claim 1, further comprising:
   initiating the calibration mode by an operator input.

10. A laser distance measurement device, comprising:
    at least one laser distance measurement unit configured to determine contactlessly a distance to a target point by emitting a laser beam to the target point;
    a camera configured to acquire at least one image of at least one target environment of the target point, the at least one image being a visible light image;
    a screen configured to output a display of the at least one image overlaid with a marker of the target point; and
    at least one computing unit configured to correct a parallax error in the display of the at least one image overlaid with the marker of the target point.

* * * * *